United States Patent
Lindahl et al.

(10) Patent No.: US 10,268,806 B2
(45) Date of Patent: Apr. 23, 2019

(54) METHOD AND SYSTEM FOR ENSURING SEQUENTIAL PLAYBACK OF DIGITAL MEDIA

(71) Applicant: Apple Inc., Cupertino, CA (US)

(72) Inventors: Aram Lindahl, Menlo Park, CA (US); Bryan J. James, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 14/792,605

(22) Filed: Jul. 6, 2015

(65) Prior Publication Data

US 2015/0310190 A1 Oct. 29, 2015

Related U.S. Application Data

(62) Division of application No. 12/241,966, filed on Sep. 30, 2008, now Pat. No. 9,077,526.

(51) Int. Cl.
*H04L 9/08* (2006.01)
*G06F 21/10* (2013.01)

(52) U.S. Cl.
CPC ............ *G06F 21/10* (2013.01); *H04L 9/08* (2013.01); *H04L 9/0861* (2013.01); *H04L 9/0891* (2013.01); *G06F 2221/0753* (2013.01); *H04L 2209/603* (2013.01)

(58) Field of Classification Search
CPC ...................................................... G06F 21/10
See application file for complete search history.

(56) References Cited

U.S. PATENT DOCUMENTS

| | | | |
|---|---|---|---|
| 6,611,607 B1 | 8/2003 | Davis et al. | |
| 7,251,833 B2 | 7/2007 | Feig et al. | |
| 7,321,660 B2 | 1/2008 | Mont et al. | |
| 7,480,635 B2 | 1/2009 | Saar et al. | |
| 2004/0093494 A1* | 5/2004 | Nishimoto | H04H 60/23 713/165 |
| 2006/0129811 A1 | 6/2006 | Fiske | |
| 2006/0265595 A1* | 11/2006 | Scottodiluzio | H04L 9/12 713/180 |
| 2007/0266399 A1* | 11/2007 | Sidi | H04N 5/4401 725/42 |
| 2008/0027864 A1* | 1/2008 | Lin | G06Q 30/02 705/50 |
| 2008/0069350 A1 | 3/2008 | Reinoso et al. | |
| 2010/0061550 A1 | 3/2010 | Nakamura | |

FOREIGN PATENT DOCUMENTS

WO 2004092956 A1 3/2004

\* cited by examiner

*Primary Examiner* — Andrew C Georgandellis
(74) *Attorney, Agent, or Firm* — Dickinson Wright RLLP (57) ABSTRACT

Techniques for ensuring that media playback proceeds sequentially through media content of a digital media asset are disclosed. In one embodiment, distinct portions (e.g., segments) of a digital media asset can be separately encrypted such that on playback decoded data being output from at least one prior portion can be used to derive a cryptographic key that is used in decrypting a subsequent portion of the digital media asset.

20 Claims, 9 Drawing Sheets

METHOD AND SYSTEM FOR ENSURING SEQUENTIAL PLAYBACK OF DIGITAL MEDIA

CROSS-REFERENCE TO RELATED APPLICATIONS

This application is a divisional of U.S. application Ser. No. 12/241,966, filed Sep. 30, 2008, of the same title, now U.S. Pat. No. 9,077,526 issued Jul. 7, 2015, the contents of which are incorporated herein by reference in their entirety for all purposes.

FIELD

The present invention relates to digital content playback and, more particularly, to controlled playback of digital media content.

BACKGROUND

In recent years music or video delivery or distribution over the Internet has become popular. In some cases, the music or video is streamed to interested persons. In other cases, electronic media files are downloaded to interested persons. The electronic media files being downloaded might be encrypted to prevent further unauthorized distribution. When the electronic media files are encrypted, the interested persons are also provided with appropriate cryptographic keys so that the encrypted media files can be decrypted. Once decrypted, the media content within the electronic media files can be played for the interested persons. However, once an electronic media file is decrypted, there is no non-intrusive way to conventionally ensure what portion the interested person has watched. Typically, nothing prevents the interested person from skipping playback of certain portions of the electronic media file that are of less interest to the interested person.

Thus, there is a need for improved approaches to control playback of electronic media files on a media playback device.

SUMMARY

The invention pertains to techniques for ensuring that media playback proceeds sequentially through media content of a digital media asset. In one embodiment, distinct portions (e.g., segments) of a digital media asset can be separately encrypted such that on playback decoded data being output from at least one prior portion can be used to derive a cryptographic key that is used in decrypting a subsequent portion of the digital media asset.

The invention can be implemented in numerous ways, including as a method, system, device, apparatus (including computer readable medium and graphical user interface). Several embodiments of the invention are discussed below.

As a method for requiring sequential playback of a digital media asset, one embodiment of the invention can, for example, include at least: accessing decryption instructions associated with the digital media asset; accessing a first segment of the digital media asset; decrypting the first segment of the digital media asset with a decryption key; decoding the decrypted first segment to obtain decoded media data; outputting the decoded media data pertaining to the decrypted first segment to an output device; determining a sequential key for a next segment of the digital media asset based on at least a portion of the decoded media data pertaining to the decrypted first segment; accessing the next segment of the digital media asset; and decrypting the next segment of the digital media asset based on at least the sequential key.

As a media playback device, one embodiment of the invention can; for example, include at least: a storage device configured to store encrypted digital media content; a decryption engine configured to decrypt the encrypted digital media content to obtain encoded media content, the decryption of the encrypted digital media content requiring a content access key and a sequential key; a decoder configured to produce decoded data from the encoded media content; an output device configured to output the decoded data; and a sequential key generator operatively connected to the decoder and the decryption engine, the sequential key generator being configured to produce different sequential keys for use by the decryption engine in decoding each of a plurality of different segments of the encrypted digital media content.

As a system for cryptographically ensuring sequential playback of a digital media asset, one embodiment can, for example, include at least: means fir accessing an nth segment of a digital media asset having a plurality of segments; means for decrypting at least the nth segment of the digital media asset with a decryption key; means for decoding the decrypted nth segment to obtain decoded media data; means for outputting the decoded media data pertaining to the decrypted nth segment to an output device; means for determining a sequential key for a n+1th segment of the digital media asset based on at least a portion of the decoded media data pertaining to the nth segment; means for accessing the n+1th segment of the digital media asset; and means for decrypting the n+1th segment of the digital media asset based on at least the sequential key.

Various aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION

The invention pertains to techniques for ensuring that media playback proceeds sequentially through media content of a digital media asset. In one embodiment, distinct portions (e.g., segments) of a digital media asset can be separately encrypted such that on playback decoded data being output from at least one prior portion can be used to derive a cryptographic key that is used in decrypting a subsequent portion of the digital media asset.

In one embodiment, a digital media asset can be doubly encrypted. One level of encryption serves to protect the digital media asset from unauthorized usage, and a second level of encryption serves to ensure that playback of the digital media asset is sequential.

The digital media asset can, for example, pertain to an audio or video media item. Typically, the audio or video media item is stored as an electronic file (e.g., electronic media file) in a data storage device. Examples of audio or video media items include songs, movies, music videos, television shows, podcasts, audio/visual presentations, and audio books.

Generally speaking, an interested person can often cause a media playback device to play at any point in an electronic media file. While such flexibility is often an advantage, in some situations it made be a disadvantage. For example, if electronic media content to be played were a tutorial on a subject, it can be an advantage to require the user to sequentially watch the electronic media content in a prescribed order. As another example, if the electronic media content includes interspersed advertisements, then it can be useful to ensure that the advertisement are properly presented and not skipped.

Advantageously, in one embodiment, the invention can ensure that certain or all portions of a digital media asset (e.g., advertisement, tutorial) are presented to users. For example, a digital media asset having interspersed advertisements can ensure that users view and/or hear the advertisements before a subsequent portion of the digital media asset is made available to the users.

In another embodiment, a command can be performed once a user has viewed and/or heard some or all of a digital asset. The command can log an event or access a remote location (e.g., using a URL) to inform a remote server that the user has viewed and/or heard some or all of the digital asset.

Embodiments of the invention are discussed below with reference to FIGS. 1A-8. However, those skilled in the art will readily appreciate that the detailed description given herein with respect to these figures is for explanatory purposes as the invention extends beyond these limited embodiments.

Figure 1:
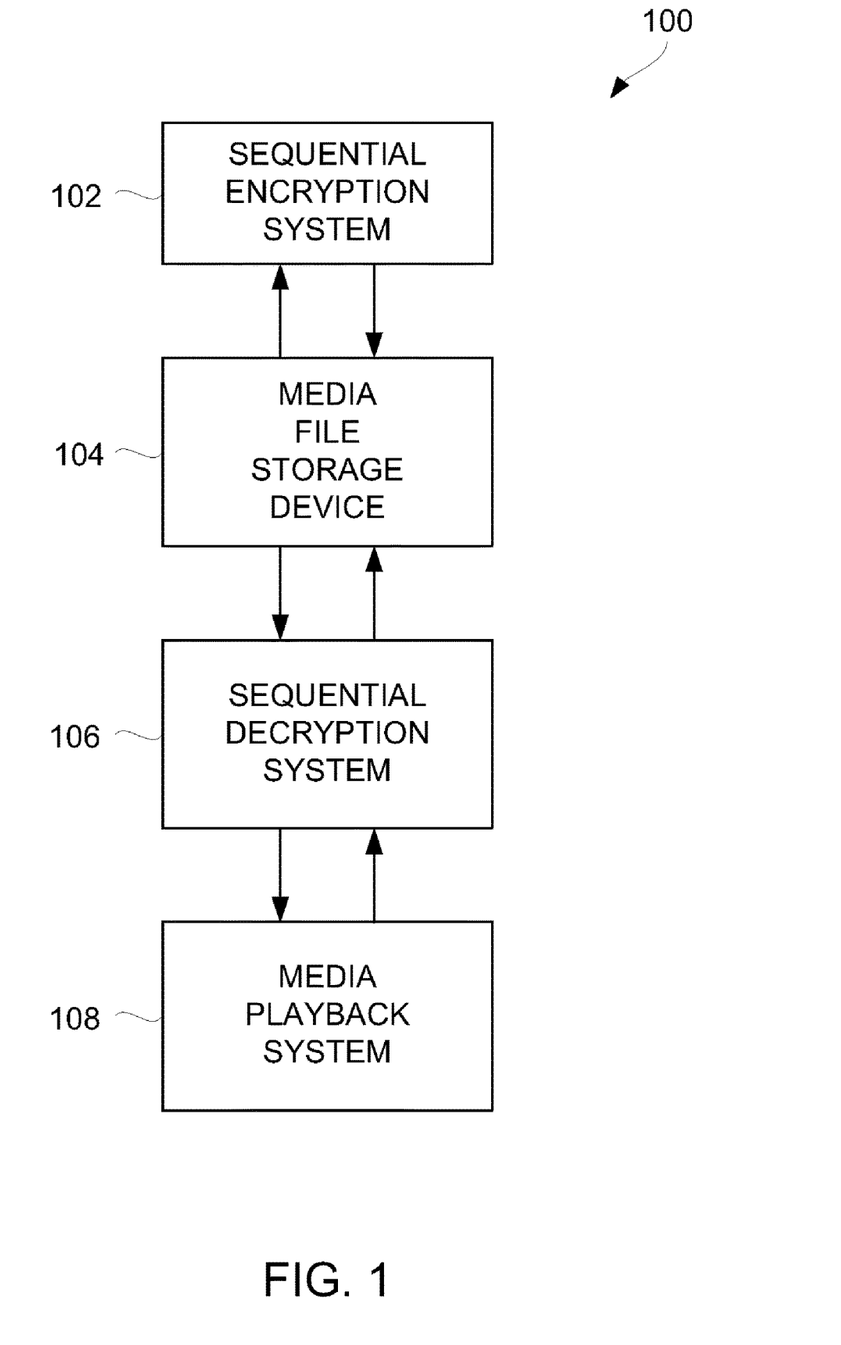
FIG. 1 is a block diagram of a media storage, decryption and playback system according to one embodiment of the invention.

FIG. 1 is a block diagram of a media storage, decryption and playback system 100 according to one embodiment of the invention. The playback system 100 includes a sequential encryption system 102 that imposes encryption to ensure sequential utilization of digital media assets, such as media items provided in media files (e.g., electronic files). The sequential encryption system 102 can be coupled to a media file storage device 104 that can store digital media assets. For example, the media file storage device 104 can store encrypted digital media assets that have been processed by the sequential encryption system 102. The encrypted digital media assets are stored as electronic files.

The system 100 also includes a sequential decryption system 106 and a playback system 108. The media playback system 108 typically operates for the benefit of a user. A user can interact with the media playback system 108 to select one or more digital media assets to be played by the media playback system 108. When a particular digital media asset is to be played, the media playback system 108 can access the particular digital media asset from the media file storage device 104 via the sequential decryption system 106. Here, in this embodiment, the particular digital media asset is stored in the media file storage device 104 in an encrypted manner. Hence, the sequential decryption system 106 is utilized to remove the sequential encryption imposed on the particular digital media asset. Thereafter, the particular digital media asset can be made available to the media playback system 108 for playback for the user.

According to one embodiment of the invention, by applying sequential encryption to digital media assets, the system 100 can ensure that the digital media asset is only capable of being played back in a sequential manner. As a result, the user of the media playback system 108 is required to view and or listen to the particular digital media asset in any sequential fashion. Although the system 100 provides sequential encryption and sequential decryption to digital media assets, it should be noted that other encryption can additionally be performed. Such other encryption can provide an additional layer of encryption. For example, the other encryption can pertain to a content encryption that restricts access to the media content to only authorized users.

Optionally, to monitor or track the playing of all or one or more certain portions (e.g., advertisement(s)) of a digital media asset being played by the media playback system 108, a command can be executed to store or perform an action locally or remotely. For example, remote actions can be initiated over a network, such as the Internet, and operate to log an event or access a remote location (e.g., using a URL) to inform a remote server that the user has viewed and/or heard all or one or more of the certain portions of the digital media asset.

Although the sequential encryption system 102 and the sequential decryption system 106 are shown in FIG. 1 as being separate, they can be provided together by a sequential encryption/decryption system. Also the media playback system 108 can include one or both of the sequential encryption system 102 and the sequential decryption system 106.

Figure 2:
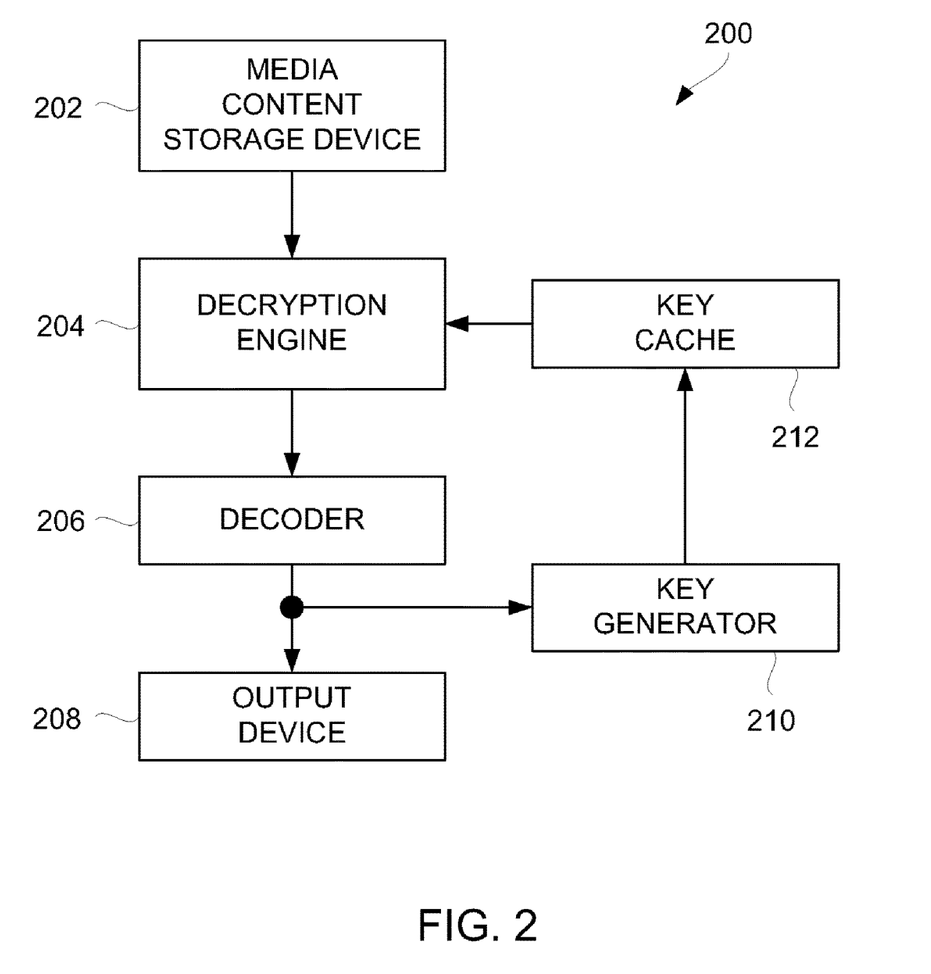
FIG. 2 is a block diagram of a media output system according to one embodiment of the invention.

FIG. 2 is a block diagram of a media output system 200 according to one embodiment of the invention. The media output system 200 illustrates operations carried out to cause an encrypted media asset having media content to be processed so that the media content is presented to a user.

The media output system 200 includes a media content storage device 202. The media content storage device 202 can, for example, store a plurality of digital media assets, each of which contains media content. In this embodiment, the digital media assets are stored to the media content storage device 202 in an encrypted form. Consequently, the digital media assets must first be decrypted before it media content can be utilized. A decryption engine 204 can decrypt the encrypted media content. Next, a decoder 206 can perform a decoding operation so that the media content can be presented to a user by way of an output device 280. The decoding required is dependent on the nature of the media content. The output device 208 can include one or more of a speaker or a display device.

According to one aspect of the media output system 200, the encryption imposed on the media content stored to the media content storage device 202 is referred to as sequential encryption. The sequential encryption is designed to ensure sequential playback of associated media content. Accordingly, the decryption of subsequent portions of media content for a particular digital media asset can depend upon earlier portions of the media content. In this regard, the media output system 200 includes a key generator 210 that couples to the decoder 206 so that the key generator 210 is able to access decoded data produced by the decoder 206. The decoded data pertains to the current portion of media content being output. The key generator 210 utilizes the decoded data pertaining to the current portion of the media content to produce a decryption key that is utilized to decrypt a subsequent portion of the media content that is to be output. The encryption key produced by the key generator 210 can then be supplied to the decryption engine 204. The decryption engine 204 can then decrypt the subsequent portion of the media content. Hence, in this embodiment, to decrypt a subsequent portion of media content requires that a prior portion of the media content be decrypted and decoded. The decoding can be processing intensive; however, the decoding is otherwise required for the output device 208 to present the media content. Therefore, the key generator 210 can gain access to the decoded data with little or no additional independent decoding. As a result, key generation is efficient because the key generator 210 does not require its own separate processing-intensive decoding operations.

Additionally, in the media output system 200 may further include a key cache 212. The key cache 212 can provide storage for one or more encryption keys produced by the key generator 210. The decryption engine 204 can access the key cache 212 to retrieve the one or more decryption keys needed to decrypt a portion of the media content to be output. The decryption keys can be maintained within the key cache 212 for a limited period of time, such as a playback session. Once the encryption keys are resident within the key cache 212, the media output system 200 can permit the user to randomly access different portions within the media content. Here, after the media content has been fully processed and viewed in a sequential manner, the necessary encryption keys for the various portions of the media content can all reside within the key cache 212 such that the media output system 200 is able to thereafter access the media content in a non-sequential manner.

Figure 3:
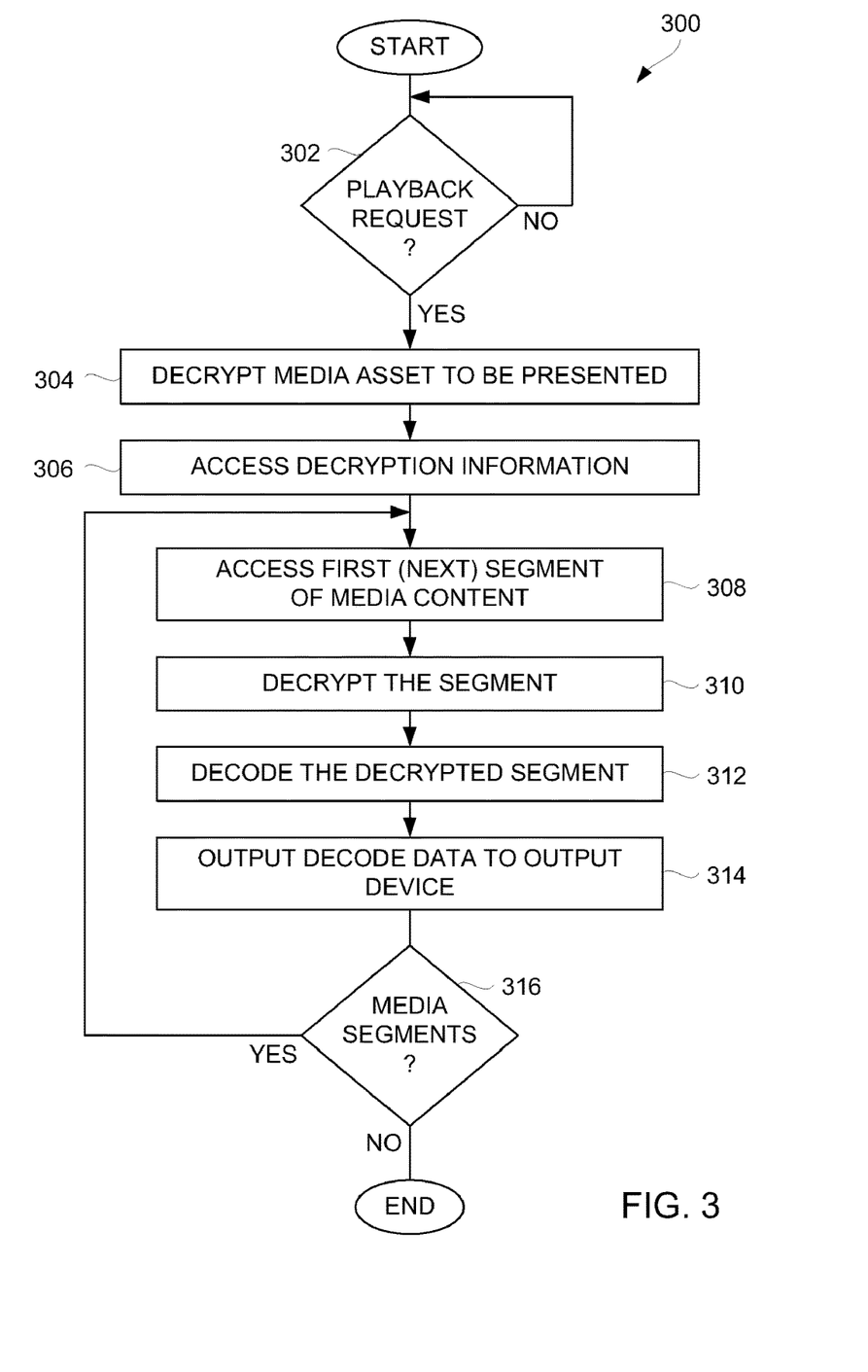
FIG. 3 is a flow diagram of a playback process according to one embodiment of the invention.

FIG. 3 is a flow diagram of a playback process 300 according to one embodiment of the invention. The playback process 300 operates to decrypt and output digital media content pertaining to a digital media asset when requested by a user.

The playback process 300 can begin with a decision 302 that determines whether a playback request has been received. When the decision 302 determines that a playback request has not been received, the playback process 300 can await such a request. Once the decision 302 determines that a playback request has been received, a media asset to be presented can be decrypted 304. Here, it is assumed that the outer level of encryption being imposed on the media asset is imposed on the media asset as a whole. For example, this level of encryption can be considered content or file level encryption. After the content or file level encryption has been removed at block 304, decryption information pertaining to the digital media asset can be accessed 306. The decryption information, if provided, can serve to provide guidance to a media playback system as to how to decrypt the media content to remove sequential encryption.

Next, a first segment of media content for the digital media asset is accessed 308. The decryption information can include information on the start and/or end of the various segments of the digital media asset. The segment that has been accessed 308 can then be decrypted 310. The decryption 310 of the segment can utilize a sequential key that has been determined from one or more prior segments or otherwise provided to the media playback system. Next, the decrypted segment can be decoded 312 to produce decoded data that is suitable for being output to an output device. The decoding can be different for different output devices and/or different types of digital media assets. For example, a video type digital media asset would be decoded differently than would an audio type digital media asset. In any case, after being decoded 312, the decoded data can be output 314 to the output device.

Thereafter, a decision 316 determines whether there are more segments of the digital media asset to be output. When the decision 316 determines that there are more segments to be output, a sequence key can be generated 318. The sequence key 318 is, for example, a sequential key they can be utilized to decrypt a subsequent segment for the digital media asset. In one embodiment, the key generation can make use of at least a portion of the data that has previously been decoded 312. After the sequence key has been generated 318, the playback process 300 can return to repeat the block 308 in subsequent blocks so that a next segment of media content for the digital media asset can be accessed 308, decrypted 310, decoded 312 and output 314 in a similar manner. Alternatively, when the decision 316 determines that there are no more segments of the digital media asset to be output, the playback process 300 can end.

Although the playback process 300 provides the decryption operation at block 304 to undo content or file level encryption from the digital media asset, in another embodiment, the digital media asset does not have content or file level encryption. In such case, the decryption operation at block 304 is not performed by the playback processing.

In one embodiment, in the case where the digital media asset is a video media asset, one or more different tracks of the video media asset can be processed separately or as a group to ensure playback of certain tracks.

FIGS. 4A-4E are illustrations of a decryption process according to one embodiment of the invention. The decryption process illustrated in FIGS. 4A-4E can pertain to one embodiment of decryption processing by the playback process 300 according to one embodiment of the invention.

Figure 4A:
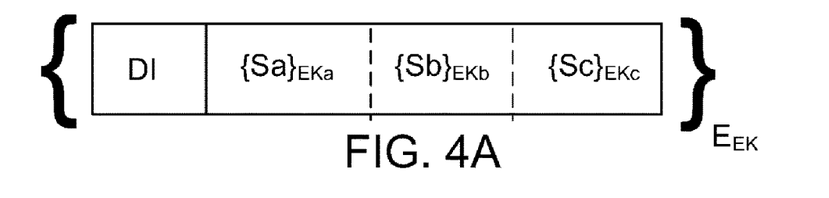
FIGS. 4A-4E are illustrations of a decryption process according to one embodiment of the invention.

FIG. 4A illustrates an encrypted digital media asset that was previously encrypted to provide mufti-level encryption. Here, an electronic file for a digital media asset was previously encrypted such that individual segments are encrypted and in addition the encrypted segments as well as decryption information are further encrypted using an encryption key. This further encryption provides an additional layer of encryption to the media content within the electronic file for the digital media asset. The further encryption also provides an initial encryption layer for the decryption information that can be within or attached to the electronic file.

Figure 4B:
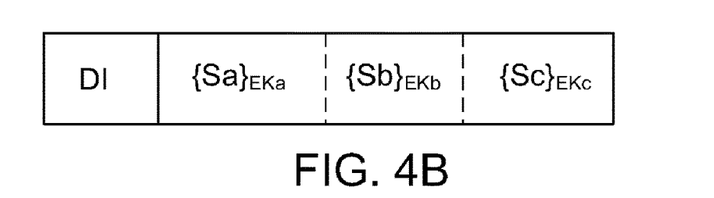
Figure 4C:
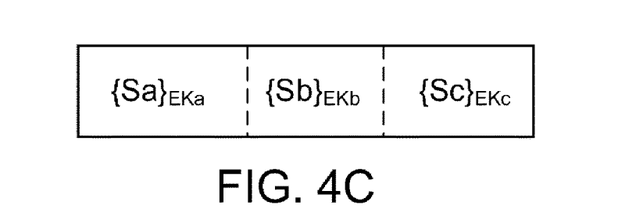

FIG. 4B illustrates the digital media asset after the initial encryption layer has been removed through a first decryption operation. The block 304 of the playback process 300 can, for example, operate to remove the first level of encryption. After the first decryption operation has been performed, as shown in FIG. 4B, the electronic file for the digital media asset has individual ones of the segments encrypted (i.e., second level of encryption). Also, after the first decryption operation, decryption information (Di) previously attached to the encrypted electronic file is fully decrypted and thus available to be accessed. The decryption information can specify segment positions within the electronic file as well as encryption algorithms and decryption key generation information. FIG. 4C illustrates the digital media asset with the decryption information removed.

Figure 4D:
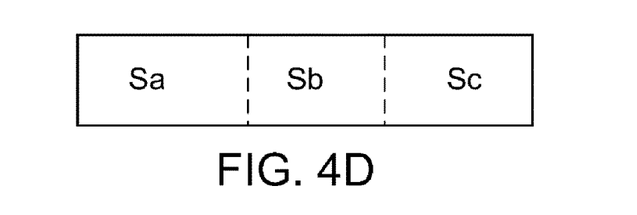
Figure 4E:
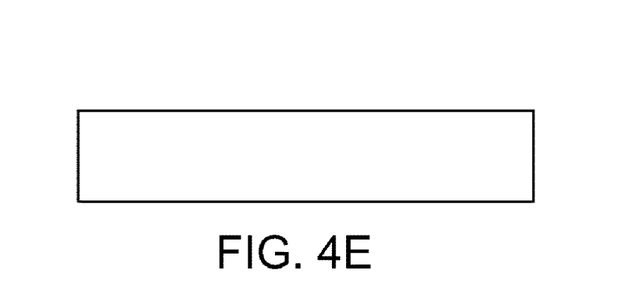

Next, the individual segment can be decrypted. Typically, the individual segments are decrypted as need and in conjunction with playback of the digital media asset. For example, block 310 of the playback process 300 can operate to remove the sequential encryption. FIG. 4D illustrates the digital media asset after the individual segments have been decrypted. Here, the encrypted segments are separately decrypted. Once decrypted, the three segments Sa, Sb and Sc are able to be accessed. Typically, different decryption keys are used to decrypt different segments. Although the different segments are still indicated in FIG. 4D, segments are for encryption and this do not impact the media content for the digital media asset. Hence, FIG. 4E illustrates the digital media asset following decryption. The resulting media content within the digital media asset following the decryption process is the same data as the data that was initially encrypted.

Figure 5A:
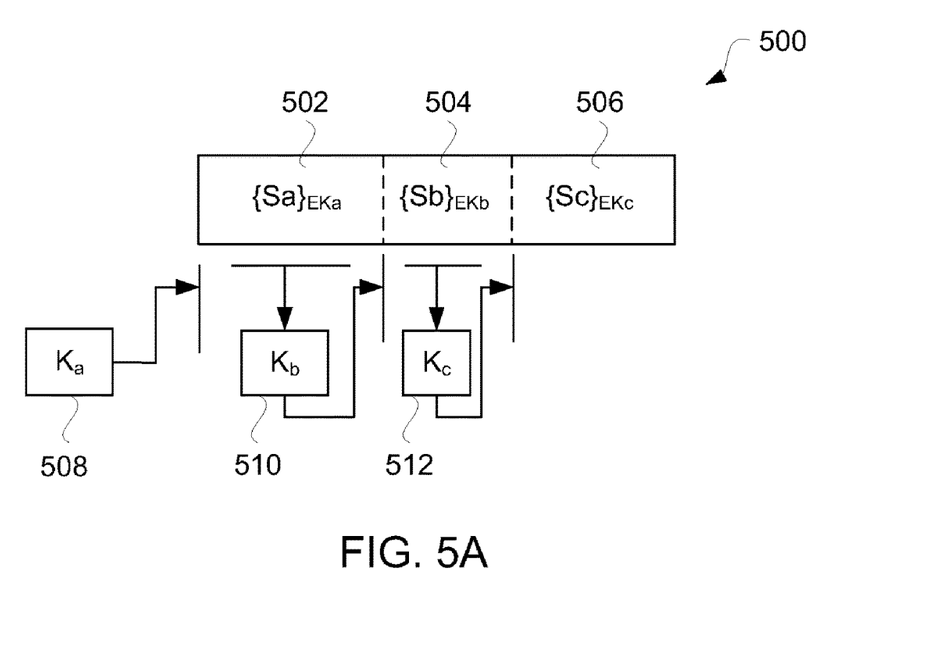
FIG. 5A is a diagrammatic illustration of a serial decryption process according to one embodiment of the invention.

FIG. 5A is a diagrammatic illustration of a serial decryption process according to one embodiment of the invention. A media asset file 500 is an electronic file that stores media data for a digital media asset. The media asset file 500 is illustrated as being segmented into three (3) segments, namely, segment Sa 502, segment Sb 504, and segment Sc 506. Each of these segments contains a portion of the media data for the digital media asset. Each of these segments is also separately encrypted using encryption keys EKa, EKb and EKc, respectively. For illustration, the media asset file 500 only has three (3) segments; however, in general the larger the media asset file the greater the number of segments. Nevertheless, in undergoing decryption, decryption keys Ka 508, Kb 510 and Kc 512 need to be generated in order to respectively decrypt the encrypted segments Sa, Sb and Sc. In this example, the decryption key Ka 508 is made available as a seed key, as already generated or as processed from an earlier segment. The decryption key Ka 508 is used to decrypt the encrypted segment Sa 502 to gain access to the media data within the segment Sa. Thereafter, the media data in the segment Sa can be decoded and output to an output device (e.g., output device 208). In doing so, some or all of the decoded media data from the segment Sa can also be used to generate the decryption key Kb 510. The key generation can use a key generation algorithm, which can specify a key generation formula as well as identify one or more specific portions of the decoded media data from the segment Sa to be used to generate the decryption key Kb 510. The decryption key Kb 510 is used to decrypt the encrypted segment Sb 504 to gain access to the media data within the segment Sb. Thereafter, the media data in the segment Sb can be decoded and output to the output device. In doing so, some or all of the decoded media data from the segment Sb can also be used to generate the decryption key Kc 512. The key generation can use a key generation algorithm, which can specify a key generation formula as well as identify one or more specific portions of the decoded media data from the segment Sb to be used to generate the decryption key Kc 512. The decryption key Kc 512 is used to decrypt the encrypted segment Sc 506 to gain access to the media data within the segment Sc. Thereafter, the media data in the segment Sc can be decoded and output to the output device.

Figure 5B:
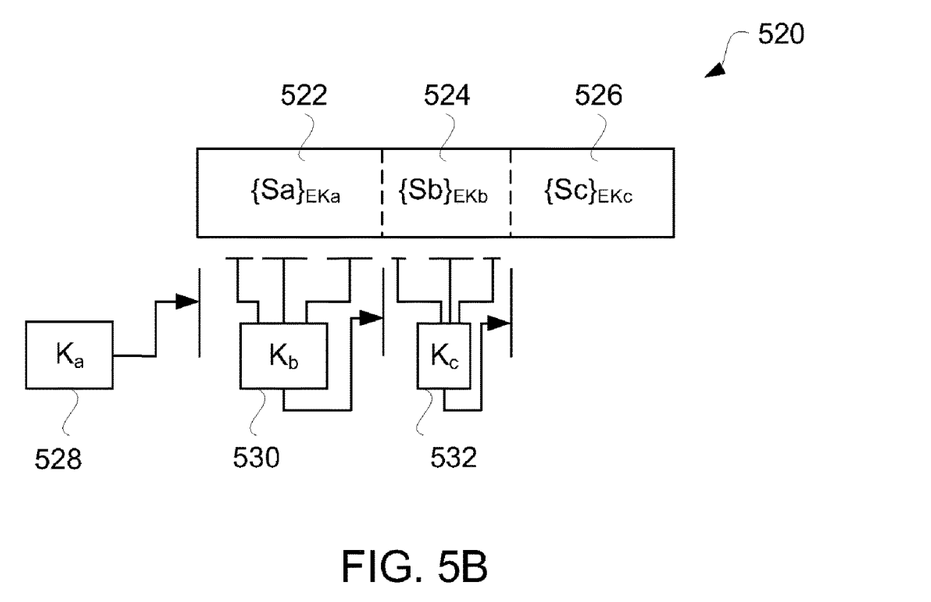
FIG. 5B is a diagrammatic illustration of a serial decryption process according to another embodiment of the invention.

FIG. SB is a diagrammatic illustration of a serial decryption process according to another embodiment of the invention. A media asset file 520 is an electronic file that stores media data for a digital media asset. The media asset file 520 is illustrated as being segmented into three (3) segments, namely, segment Sa 522, segment SI) 524, and segment Sc 526. Each of these segments contains a portion of the media data for the digital media asset. Each of these segments is also separately encrypted using encryption keys EKa, EKb and EKc, respectively. For illustration, the media asset file 520 only has three (3) segments; however, in general the larger the media asset file the greater the number of segments. Nevertheless, in undergoing decryption, decryption keys Ka 528, Kb 530 and Kc 532 need to be generated in order to respectively decrypt the encrypted segments Sa, Sb and Sc. In this example, the decryption key Ka 528 is made available as a seed key, as already generated or as processed from an earlier segment. The decryption key Ka 528 is used to decrypt the encrypted segment Sa 522 to gain access to the media data within the segment Sa. Thereafter, the media data in the segment Sa can be decoded and output to an output device (e.g., output device 208). In doing so, predetermined portions of the decoded media data from the segment Sa can also be used to generate the decryption key Kb 530, in one example, as illustrated in FIG. 5B, three distinct portions of the decoded media data from the segment Sa 522 are used to determine the decryption key Kb 530. Although three distinct portions are illustrated in FIG. 5B, it should be recognized that any number of portions can be similarly utilized. The key generation can use a key generation algorithm, which can specify a key generation formula as well as specify the specific portions of the decoded media data from the segment Sa to be used to generate the decryption key Kb 530, The decryption key Kb 530 is used to decrypt the encrypted segment Sb 524 to gain access to the media data within the segment Sb. Thereafter, the media data in the segment Sb can be decoded and output to the output device. In doing so, predetermined portions of the decoded media data from the segment Sb can also be used to generate the decryption key Kc 532. In one example, as illustrated in FIG. 5B, three distinct portions of the decoded media data from the segment Sb are used to determine the decryption key Kc 532. The key generation can use a key generation algorithm, which can specify a key generation formula as well as specify the specific portions of the decoded media data from the segment Sb to be used to generate the decryption key Kc 532. In should be noted that the key generation can be performed differently in different segments, such as through use of different key generation formula and/or different specific portions. The decryption key Kc 532 is used to decrypt the encrypted segment Sc 526 to gain access to the media data within the segment Sc. Thereafter, the media data in the segment Sc can be decoded and output to the output device.

Figure 5C:
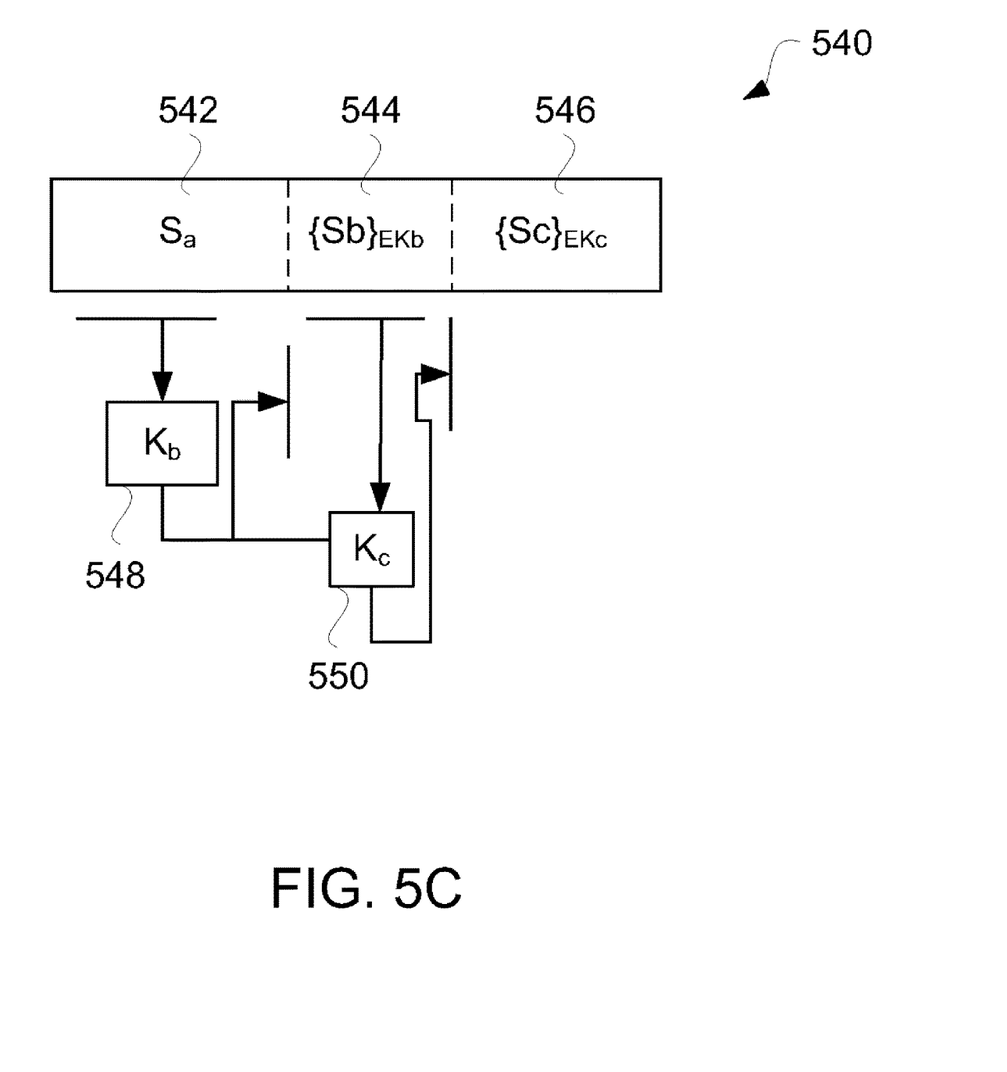
FIG. 5C is a diagrammatic illustration of a serial decryption process according to still another embodiment of the invention.

FIG. 5C is a diagrammatic illustration of a serial decryption process according to still another embodiment of the invention. A media asset file 540 is an electronic file that stores media data for a digital media asset. The media asset file 540 is illustrated as being segmented into three (3) segments, namely, segment Sa 542, segment Sb 544, and segment Sc 546. Each of these segments contains a portion of the media data for the digital media asset. The segment Sa is not encrypted, while the segments Sb and Sc are separately encrypted using encryption keys EKb and EKc, respectively. For illustration, the media asset file 540 only has three (3) segments; however, in general the larger the media asset file the greater the number of segments. Nevertheless, in undergoing decryption, decryption keys Kb 548 and Kc 550 need to be generated in order to respectively decrypt the encrypted segments Sb and Sc. In this example, the segment Sa 542 is not encrypted so there is no need to generate a decryption key Ka. The media data in the segment Sa can be decoded and output to an output device (e.g., output device 208). In doing so, some or all of the decoded media data from the segment Sa can also be used to generate the decryption key Kb 548. The key generation can use a key generation algorithm, which can specify a key generation formula as well as specify specific portions of the decoded media data from the segment Sa to be used to generate the decryption key Kb 548. The decryption key Kb 548 is used to decrypt the encrypted segment Sb 544 to gain access to the media data within the segment Sb. Thereafter, the media data in the segment Sb can be decoded and output to the output device. In doing so, some or all of the decoded media data from the segment Sb can also be used to generate the decryption key Kc 550. The key generation can use a key generation algorithm, which can specify a key generation formula as well as specify specific portions of the decoded media data from the segment Sb to be used to generate the decryption key Kc 550. In should be noted that the key generation can be performed differently in different segments, such as through use of different key generation formula and/or different specific portions. The decryption key Kc 550 is used to decrypt the encrypted segment Sc 546 to gain access to the media data within the segment Sc. Thereafter, the media data in the segment Sc can be decoded and output to the output device.

Figure 6:
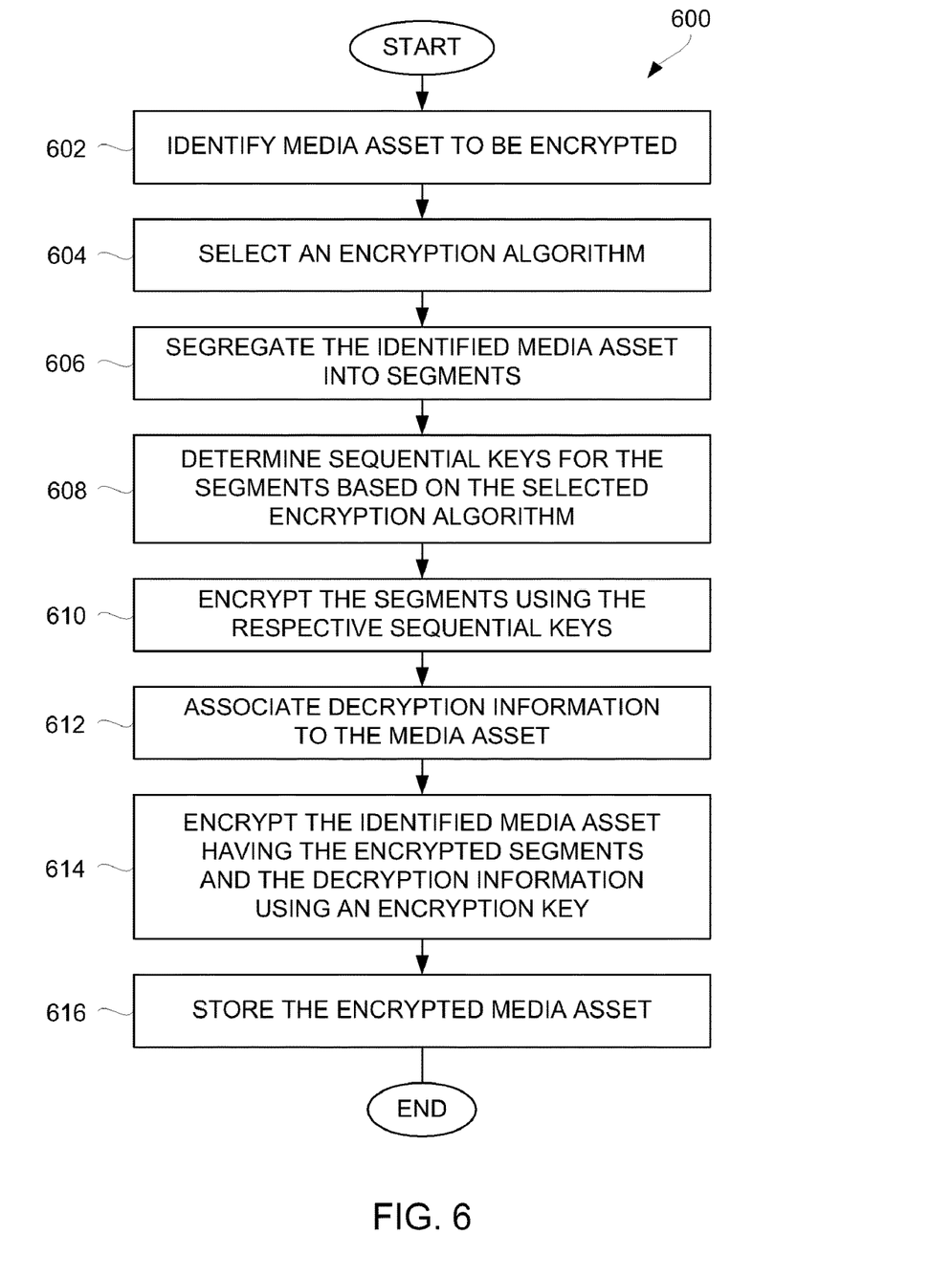
FIG. 6 is a flow diagram of an encryption process according to one embodiment of the invention.

FIG. 6 is a flow diagram of an encryption process 600 according to one embodiment of the invention. The encryption process 600 operates to impose encryption on a digital media asset, in particular, the encryption process 600 imposes multi-level encryption to a digital media asset. In this illustrated embodiment, the first level of encryption is sequential encryption, and the second level encryption is content encryption. However, in an alternative embodiment, the second level encryption is not performed.

The encryption process initially identifies 602 a media asset to be encrypted. An encryption algorithm is then selected 604. For example, the encryption algorithm can be predetermined or randomly determined. The identified media asset can then be segregated 606 into different segments.

Next, sequential keys can be determined 608 for the segments based on the selected encryption algorithm. In one embodiment, one or more of these selected encryption algorithms can utilize decoded data from prior segments to determine 608 the sequential key for a subsequent segment. Hence, in such an embodiment, decoded data of segments may need to be determined in order to determined 608 the sequential keys.

After the sequential keys have been determined 608, the segments can be encrypted 610 utilizing the respective sequential keys. Decryption information can also be associated 612 to the media asset. The decryption information can provide information to assist with subsequent decryption of the encrypted media asset. For example, the decryption information can identify or provide a reference to determine the encryption algorithm utilized or the app4ropriate decryption algorithm to be utilized as well as information on beginning and/or end points of segments of the media asset to be encrypted. Further, the identified media asset can be encrypted 614 using an encryption key. Here, the identified media asset at this time can contain the encrypted segments as well as the decryption information. Hence, the encryption 614 of the identified media asset imposes a second level of encryption to the identified media asset. Thereafter, the encrypted media asset can be stored 616 such that it is available for distribution. Following the block 616, the encryption process 600 can end.

Although the encryption process 600 provides the encryption operation at block 614 to provide content or file level encryption to the digital media asset, in another embodiment, the digital media asset does not have content or file level encryption. In such case, the encryption operation at block 614 is not performed by the encryption processing.

It should be noted that the different segments resulting from the segregation 606 can pertain to a single media asset or a plurality of different media assets. In the case of a plurality of different media assets, in one embodiment, the segments from the different media assets can be interspersed.

FIGS. 7A-7E are illustrations of an encryption process according to one embodiment of the invention. The encryption process illustrated in FIGS. 7A-7E can pertain to one embodiment of the encryption process 600 according to one embodiment of the invention.

Figure 7A:
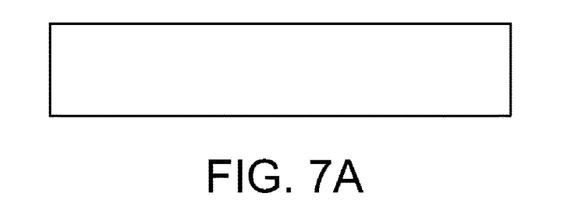
FIGS. 7A-7E are illustrations of an encryption process according to one embodiment of the invention.
Figure 7B:
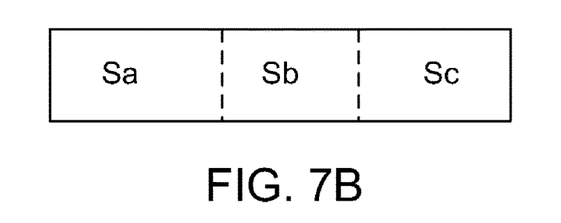

FIG. 7A illustrates a digital media asset being provided as an electronic file that is freely accessible. FIG. 7B illustrates a segmented digital media asset. In this example, the segmented digital media asset has three segments Sa, Sb and Sc. The media content of the segmented digital media asset is the same as the digital media asset prior to segmentation. It should be understood that the segmented digital media asset illustrated in FIG. 7B can be comprised of segments from a single file or multiple files. For example, the three segments Sa, Sb and Sc may originate from multiple digital media assets.

Figure 7C:
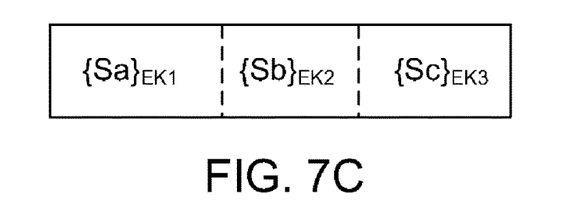
Figure 7D:
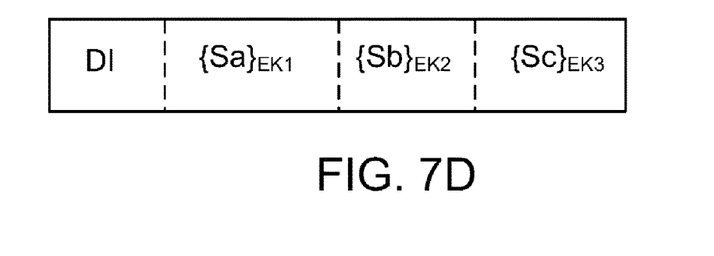
Figure 7E:
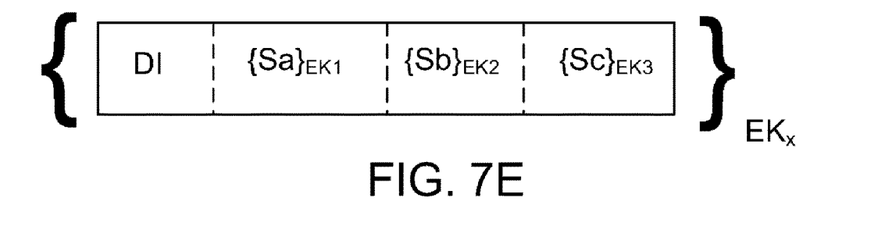

As noted above, the encryption process 600 can separately encrypt the segments of the segmented digital media asset. FIG. 7C illustrates a digital media asset with encrypted segments. Typically, different encryption keys are used to encrypt different segments. For example, as shown in FIG. 7C, the segment Sa is encrypted by an encryption key EK1, the segment Sb is encrypted by an encryption key EK2, and the segment Sc is encrypted by an encryption key EK3. Also, as discussed above decryption information can be attached to an electronic file for a digital media asset. FIG. 7D illustrates decryption information (Di) attached to the electronic file having the digital media asset stored as encrypted segments. The decryption information can specify segment positions within the electronic file(s) as well as encryption algorithms and decryption key generation information. FIG. 7E illustrates an encrypted digital media asset. Here, the electronic file for the digital media asset having encrypted segments and the decryption information can be further encrypted using an encryption key (EKx). This further encryption provides an additional layer of encryption to the media content within the electronic file for the digital media asset. The further encryption also provides an initial encryption layer for the decryption information within or attached to the electronic file.

Figure 8:
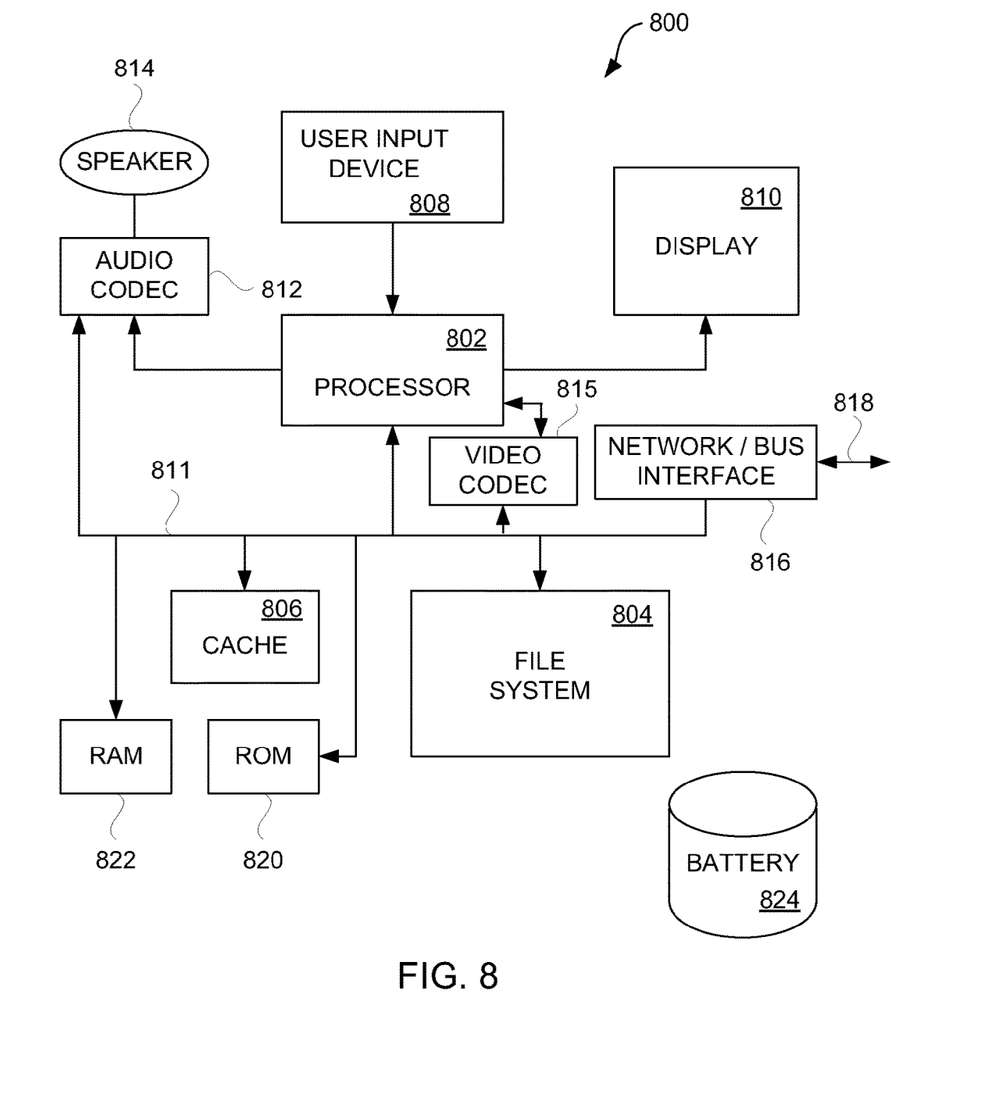
FIG. 8 is a block diagram of a media player suitable for use with the invention.

The media playback device can, for example, be a portable electronic device. FIG. 8 is a block diagram of a media player 800 suitable for use with the invention. The media player 800 illustrates circuitry of a representative portable media device.

The media player 800 includes a processor 802 that pertains to a microprocessor or controller for controlling the overall operation of the media player 800. Also, with respect to the media output system 200 illustrated in FIG. 2, the processor 802 can in one embodiment implement the decryption engine 204, the key generator 210 and/or the key cache 212. The media player 800 stores media data pertaining to media items in a file system 804 and a cache 806. The file system 804 is, typically, semiconductor memory (e.g., Flash memory) and/or one or more storage disks. The file system 804 typically provides high capacity storage capability for the media player 800. However, since the access time to the file system 804 can be relatively slow, the media player 800 can also include the cache 806. The cache 806 is, for example, Random-Access Memory (RAM) provided by semiconductor memory. The relative access time to the cache 806 is typically shorter than for the file system 804. However, the cache 806 does not have the large storage capacity of the file system 804. Further, the file system 804, when active, consumes more power than does the cache 806. The power consumption is often a concern when the media player 800 is a portable media player that is powered by a battery 824. The media player 800 also includes a RAM 820 and a Read-Only Memory (ROM) 822. The ROM 822 can store programs, utilities or processes to be executed in a non-volatile manner. The RAM 820 provides volatile data storage, such as for the cache 806.

The media player 800 also includes a user input device 808 that allows a user of the media player 800 to interact with the media player 800. For example, the user input device 808 can take a variety of forms, such as a button, keypad, dial, touch-sensitive surface, eta. Still further, the media player 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, the media player 800 serves to store a plurality of media items (e.g., songs, videos, podcasts, etc.) in the file system 804. When a user desires to have the media player play a particular media item, a list of available media items is displayed on the display 810. Then, using the user input device 808, a user can select one of the available media items. The processor 802, upon receiving a selection of a particular media item, supplies the media data to one or more appropriate output devices. If the particular media item is encrypted, the particular media item is first decrypted as noted above, which could involve one or more layers of encryption. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the media player 800 or external to the media player 800. For example, headphones or earphones that connect to the media player 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The media player 800 also includes a network/bus interface 816 that couples to a data link 818. The data link 818 allows the media player 800 to couple to another device (e.g., a host computer, a power source, or an accessory device). The data link 818 can be provided over a wired connection or a wireless connection. In the case of a wireless connection, the network/bus interface 816 can include a wireless transceiver. The data link 818 can also provide power to the media player 800 (e.g., to charge the battery 824).

A portable electronic device as discussed herein may, but need not, be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels. Even smaller, and thus more portable devices, are wearable electronic devices.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory, and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The advantages of the invention are numerous. Different embodiments or implementations may, but need not, yield one or more of the following advantages. One advantage of certain embodiments of the invention is that sequential playback of digital media assets can be enforced. Another advantage of certain embodiment of the invention is that cryptographic techniques can be utilized to ensure sequential playback. Another advantage of certain embodiment of the invention is that processing for ensuring sequential playback can be efficiently performed by making use of processing otherwise performed for media playback. Still another advantage of certain embodiment of the invention is that multiple levels of encryption can be utilized, where one of the levels serves to ensure sequential playback.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for requiring a media asset to be played back sequentially, the method comprising, at a server device:
    selecting an encryption algorithm;
    dividing the media asset into a first segment and a plurality of additional segments arranged in a sequence;
    generating a sequential key for each segment in the plurality of additional segments, wherein the sequential key for a particular segment in the plurality of additional segments arranged in the sequence is based, at least in part, on decoded media data included in a previous segment of the media asset immediately prior to the particular segment in the sequence;
    encrypting, based on the selected encryption algorithm, each segment in the media asset in accordance with a corresponding encryption key to produce a plurality of encrypted segments, wherein the first segment is encrypted with a seed key and each particular segment in the plurality of additional segments is encrypted with the sequential key generated for the particular segment;
    generating decryption information for decrypting the plurality of encrypted segments, wherein the decryption information identifies the selected encryption algorithm;
    combining the plurality of encrypted segments and the decryption information to produce a protected media asset; and
    storing the protected media asset,
    wherein the sequential keys are not included in the decryption information to cause a decryption algorithm to decrypt the plurality of encrypted segments, in an order according to the sequence, to generate the decoded media data included in each segment that is utilized to reconstruct the sequential key for a subsequent segment in the sequence.

2. The method of claim 1, further comprising, in response to receiving a request for the media asset from the client device, providing the protected media asset to the client device.

3. The method of claim 2, further comprising, prior to providing the protected media asset to the client device:
    encrypting the protected media asset using a master key; and
    providing the master key to the client device.

4. The method of claim 1, wherein the decryption information indicates a starting encrypted segment and an ending encrypted segment within the protected media asset.

5. The method of claim 4, wherein the decryption information indicates that a first encryption key corresponds to the first segment.

6. The method of claim 1, further comprising:
    identifying the media asset to be encrypted.

7. The method of claim 1, wherein the corresponding encryption key for each particular segment in the plurality of additional segments arranged in the sequence is based on two or more distinct portions of the decoded media data included in a previous segment of the media asset immediately prior to the particular segment in the sequence.

8. A non-transitory computer readable storage medium configured to store instructions that, when executed by a processor included in a computing device, cause the computing device to carry out steps that include:
    selecting an encryption algorithm;
    dividing a media asset into a first segment and a plurality of additional segments arranged in a sequence;
    generating a sequential key for each segment in the plurality of additional segments, wherein the sequential key for a particular segment in the plurality of additional segments arranged in the sequence is based, at least in part, on decoded media data included in a previous segment of the media asset immediately prior to the particular segment in the sequence, wherein the first segment is encrypted with a seed key and each particular segment in the plurality of additional segments is encrypted with the sequential key generated for the particular segment;
    encrypting each segment in the media asset in accordance with a corresponding encryption key to produce a plurality of encrypted segments;
    generating decryption information for decrypting the plurality of encrypted segments, wherein the decryption information identifies the selected encryption algorithm;
    combining the plurality of encrypted segments and the decryption information to produce a protected media asset; and
    storing the protected media asset,
    wherein the sequential keys are not included in the decryption information to cause a decryption algorithm to decrypt the plurality of encrypted segments, in an order according to the sequence, to generate the decoded media data included in each segment that is utilized to reconstruct the corresponding sequential key for a subsequent segment in the sequence.

9. The non-transitory computer readable storage medium of claim 8, wherein the steps further include, in response to receiving a request for the media asset from the client device, providing the protected media asset to the client device.

10. The non-transitory computer readable storage medium of claim 9, wherein the steps further include, prior to providing the protected media asset to the client device:
    encrypting the protected media asset using a master key; and
    providing the master key to the client device.

11. The non-transitory computer readable storage medium of claim 8, wherein the decryption information indicates a starting encrypted segment and an ending encrypted segment within the protected media asset.

12. The non-transitory computer readable storage medium of claim 11, wherein the decryption information indicates that a first encryption key corresponds to the first segment.

13. The non-transitory computer readable storage medium of claim 8, wherein the steps further include:
    identifying the media asset to be encrypted.

14. The non-transitory computer readable storage medium of claim 8, wherein the corresponding encryption key for each particular segment in the plurality of additional segments arranged in the sequence is based on two or more distinct portions of the decoded media data included in a previous segment of the media asset immediately prior to the particular segment in the sequence.

15. A computing device, comprising:
a processor configured to cause the computing device to carry out steps that include:
selecting an encryption algorithm;
dividing a media asset into a first segment and a plurality of additional segments arranged in a sequence;
generating a sequential key for each segment in the plurality of additional segments, wherein the sequential key for a particular segment in the plurality of additional segments arranged in the sequence is based, at least in part, on decoded media data included in a previous segment of the media asset immediately prior to the particular segment in the sequence, wherein the first segment is encrypted with a seed key and each particular segment in the plurality of additional segments is encrypted with the sequential key generated for the particular segment;
encrypting each segment in the media asset in accordance with a corresponding encryption key to produce a plurality of encrypted segments;
generating decryption information for decrypting the plurality of encrypted segments, wherein the decryption information identifies the selected encryption algorithm;
combining the plurality of encrypted segments and the decryption information to produce a protected media asset; and
storing the protected media asset,
wherein the sequential keys are not included in the decryption information to cause a decryption algorithm to decrypt the plurality of encrypted segments, in an order according to the sequence, to generate the decoded media data included in each segment that is utilized to reconstruct the corresponding sequential key for a subsequent segment in the sequence.

16. The computing device of claim 15, wherein the steps further include, in response to receiving a request for the media asset from the client device, providing the protected media asset to the client device.

17. The computing device of claim 16, wherein the steps further include, prior to providing the protected media asset to the client device:
encrypting the protected media asset using a master key; and
providing the master key to the client device.

18. The computing device of claim 15, wherein the decryption information indicates a starting encrypted segment and an ending encrypted segment within the protected media asset.

19. The computing device of claim 18, wherein the decryption information indicates that a first encryption key corresponds to the first segment.

20. The computing device of claim 15, wherein the corresponding encryption key for each particular segment in the plurality of additional segments arranged in the sequence is based on two or more distinct portions of the decoded media data included in a previous segment of the media asset immediately prior to the particular segment in the sequence.

* * * * *